United States Patent [19]
Rowe et al.

[11] Patent Number: 5,508,891
[45] Date of Patent: Apr. 16, 1996

[54] DRAWOUT TERMINAL BLOCK TRAY AND CONTROL STATION FOR SWITCHGEAR

[75] Inventors: Neal E. Rowe; Richard M. Larson, both of Asheville; William E. Wilkie, II, Fletcher, all of N.C.

[73] Assignee: Eaton Corporation, Cleveland, Ohio

[21] Appl. No.: 222,977

[22] Filed: Apr. 5, 1994

[51] Int. Cl.$^6$ .................................................. H01H 85/20
[52] U.S. Cl. .......................... 361/833; 361/727; 361/826; 361/828
[58] Field of Search .................................... 361/608, 610, 361/614, 626, 628, 657–658, 666, 725–727, 822–828, 833–837

[56] References Cited

U.S. PATENT DOCUMENTS

| | | | |
|---|---|---|---|
| 2,431,999 | 12/1947 | Engelhardt | 361/657 |
| 2,566,064 | 8/1951 | Keim | 361/726 |
| 2,994,807 | 8/1961 | Devine et al. | 361/727 |
| 4,090,230 | 5/1978 | Fuller et al. | 361/617 |
| 4,565,908 | 1/1986 | Bould | 200/50 |
| 5,341,273 | 8/1994 | Sharp et al. | 361/826 |

FOREIGN PATENT DOCUMENTS

| 4029507 | 1/1992 | Japan | 361/626 |
|---|---|---|---|

OTHER PUBLICATIONS

Installation and Maintenance Manual AKD-8 Low-voltage Switchgear, pp. 4, 6, 8–12, 18–43, 1983, General Electric GEH-4674A.

*Primary Examiner*—Gregory D. Thompson
*Attorney, Agent, or Firm*—Martin J. Moran

[57] ABSTRACT

An enclosure for drawout circuit interrupters having instrumentation and control wiring includes a housing having circuit interrupter recesses; wiring tray recesses; wiring trays each of which hold the wiring for one of the circuit interrupters; drawout mechanisms for removing the trays from the tray recesses; and brackets for hanging the trays from the enclosure. The trays may have a molded plastic front panel. The trays may also have internal lances or holes for securing the wiring thereto, two rear holes for routing the wiring therethrough, and a bottom side having holes for mounting rails for securing terminal blocks or fuse blocks thereto. The rear holes may hold peripheral plastic conduits for protecting the wiring. The front panel may have recess pockets for holding a descriptive nameplate, and center punches to facilitate mounting instrumentation or control devices. The drawout mechanisms may have a rectangular guide bar beneath the trays. Each tray may have a corresponding guide mechanism which rests on the guide bar. The guide mechanism may have two arms each of which abut a side of the corresponding guide bar. The drawout mechanisms may further have H-shaped slide bars attached to the sides of the trays and L-shaped brackets attached to the housing within the tray recesses. Each of the L-shaped brackets may have a C-shaped channel for guiding one of the slide bars. The drawout mechanisms may also have blocking tabs for partially blocking a drawout movement of the trays from the tray recesses.

22 Claims, 8 Drawing Sheets

DRAWOUT TERMINAL BLOCK TRAY AND CONTROL STATION FOR SWITCHGEAR

BACKGROUND OF THE INVENTION

1. Field of the Invention

This invention relates to a termination device for switchgear and more particularly to a drawout terminal block tray for housing external instrumentation and control wiring of a circuit interrupter.

2. Background of Information

Low voltage switchgear, which has a maximum power line voltage of 600 VAC, is generally mounted in an enclosure which houses up to four circuit interrupters. Power cables for the circuit interrupters are generally terminated in the rear of the enclosure. Instrumentation and control terminal blocks for the circuit interrupters, which have a nominal control voltage of 120 VAC, may either be mounted in the rear or the front of the enclosure.

Drawout circuit breakers or drawout circuit interrupters may be completely removed from the front of the enclosure for repair, testing or maintenance. Because of this drawout mode of operation, the instrumentation and control terminal blocks may either be mounted in the rear of the enclosure, which does not interfere with the drawout removal of the circuit breakers, or the terminal blocks may be mounted away from the drawout path of the circuit breakers in the front of the enclosure. Front mounting of terminal blocks with drawout circuit breakers, thus, requires that individual portions of the front surface of the enclosure be dedicated to either, but not both of, the drawout circuit breakers or the terminal blocks. Therefore, the front surface area of the enclosure is at a premium and must be carefully allocated.

Whenever the instrumentation and control terminal blocks are mounted in the rear of the enclosure, special barriers are typically provided to ensure the integrity of the wiring design and to protect instrumentation and control service personnel from the higher switchgear voltages.

On the other hand, if the instrumentation and control terminal blocks are mounted in the front of the enclosure, two options are possible. One or more circuit interrupters may be removed from the enclosure and moved to a separate enclosure, in order to provide space for mounting the instrumentation and control terminal blocks. Otherwise, one or more separate instrumentation and control enclosures are provided for housing the terminal blocks. Although front mounting generally improves the wiring design integrity, enhances the safety of service personnel, and reduces the length of the wiring, the cost of providing the additional enclosures and the requisite floor space for such enclosures is a substantial disadvantage.

There is a need, therefore, for a compact front-access termination device which accommodates the external instrumentation and control wiring of a circuit interrupter.

There is a more particular need for such a termination device that is located in an enclosure which houses the circuit interrupter.

There is an even more particular need for such a termination device that presents the floor space required by the enclosure and permits the same number of circuit interrupters to be housed by the enclosure.

SUMMARY OF THE INVENTION

These and other needs are satisfied by the invention which is directed to an enclosure for housing at least one drawout circuit interrupter having external instrumentation and control wiring. The enclosure includes a housing having a first plurality of recesses for housing the drawout circuit interrupters and a second plurality of recesses. Each of the drawout circuit interrupters are insertable into and removable from one of the first recesses. The enclosure also includes at least one tray which holds the wiring for a corresponding circuit interrupter. Each of the trays is slidably mounted in the housing in a corresponding one of the second recesses.

The front of each tray is attached to a corresponding molded plastic front panel which includes fasteners for fastening the molded panel to the housing. The molded panel includes two recess pockets for holding descriptive information, such as a descriptive nameplate or a warning label, and plural center punches which facilitate mounting control devices, such as circuit interrupter switches or indicators, or instrumentation, such as a metering device, to the panel.

Each tray has plural sides which either have plural lances or else plural holes for securing the wiring thereto by tie-wraps. The rear side of the tray has plural routing holes for routing the wiring between the circuit interrupter, the tray, and a remote control area. These routing holes each hold a peripheral protective plastic conduit which protects and isolates the wiring from the rear of the housing. The bottom side of the tray has plural mounting holes for mounting rails which secure terminal blocks for terminating the wiring and fuse blocks for fusing the wiring.

The enclosure further includes at least one drawout mechanism, each of which cooperates with a corresponding one of the second recesses for inserting the corresponding tray therein and removing the corresponding tray therefrom. Each drawout mechanism has a slider mechanism for slidably removing the corresponding tray from the housing. The slider mechanism includes a rectangular guide bar beneath the corresponding tray. Each tray includes a guide mechanism which rests on the corresponding guide bar and which has two arms for abutting two sides of the guide bar. Each drawout mechanism further has two H-shaped slide bars and two L-shaped brackets within the corresponding second recess. The H-shaped slide bars are attached to the sides of the corresponding tray. The L-shaped brackets are attached within the corresponding second recess and each have a C-shaped channel for guiding one of the H-shaped slide bars.

Each drawout mechanism further has two nylon blocking tabs for at least partially blocking a drawout movement of the corresponding tray from the corresponding second recess and the enclosure. The blocking tabs are riveted to a mounting surface on the rear of the corresponding tray and have a blocking surface which contacts a front surface of the housing whenever the corresponding tray is at least partially drawnout from the enclosure. The tabs have a flexible arm for moving the blocking surface away from the front surface of the housing, in order to permit complete withdrawal of the corresponding tray from the corresponding second recess.

The enclosure also includes at least one hanging mechanism, each of which cooperates with a corresponding one of the trays in order to hang the tray from the enclosure. The enclosure may further include a door for each of the drawout circuit interrupters. Each hanging mechanism may have two L-shaped hanging brackets pivotally attached to the rear of the corresponding tray for hanging the tray on a corresponding one of the doors.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
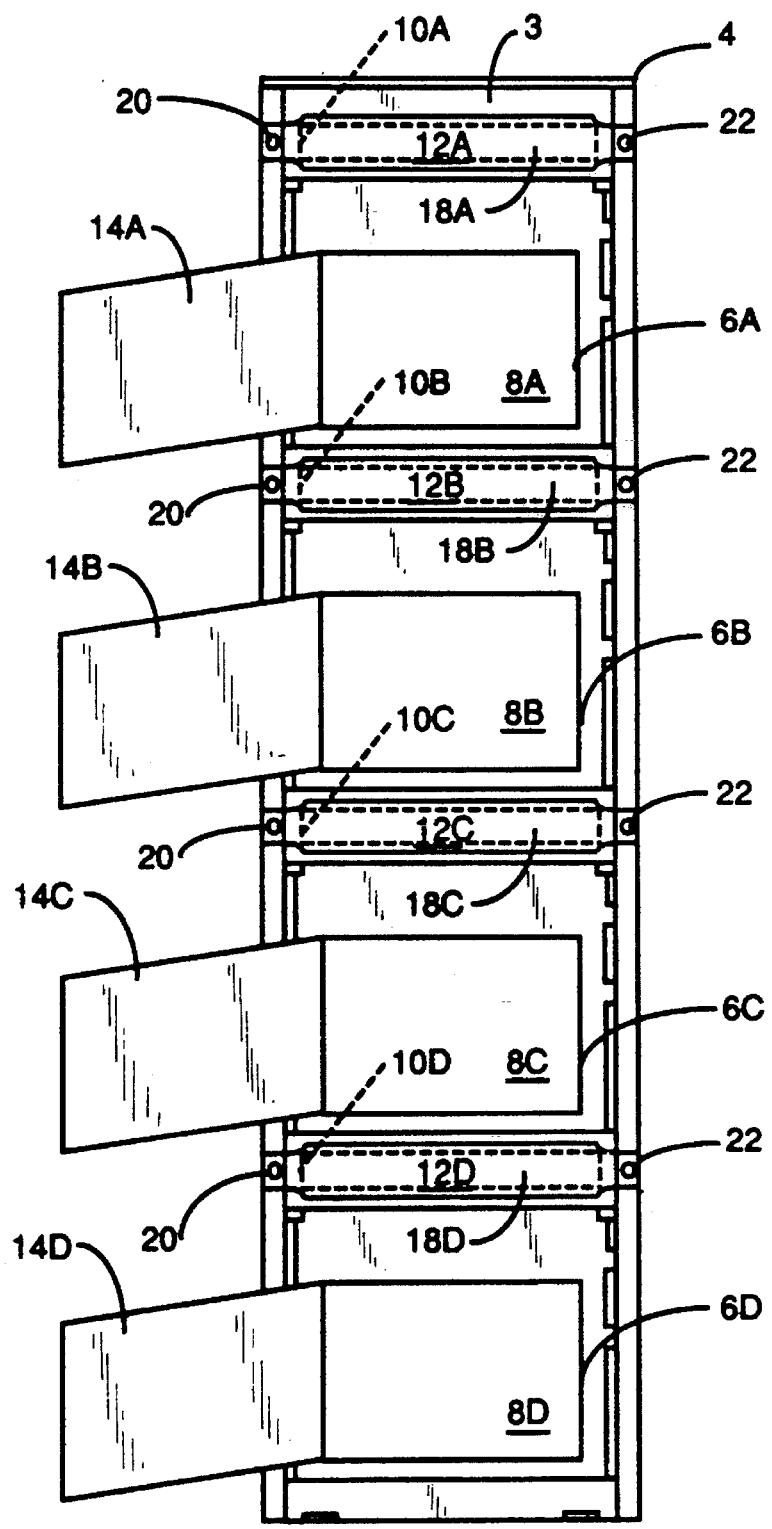
FIG. 1 is a front view of an enclosure having four drawout circuit breakers and four drawout termination trays in accordance with the invention.

Referring to FIG. 1, a front view of an enclosure 2 is illustrated. The enclosure 2 includes a housing 4 which has four circuit breaker recesses 6A,6B,6C,6D for up to four drawout circuit breakers 8A,8B,8C,8D. Such drawout circuit breakers 8 are well known in the art. For example, drawout circuit breakers 8 are marketed by Cutler-Hammer Westinghouse Products as type DS or type DSL power circuit breakers. Another example of a drawout circuit breaker is disclosed in U.S. Pat. No. 4,565,908 issued Jan. 21, 1986, which is herein incorporated by reference. The enclosure 2 also includes four tray recesses 10A, 10B, 10C, 10D (shown in shadow) for up to four drawout termination trays 12A, 12B, 12C, 12D, respectively. It being understood that the present invention is applicable to any number of circuit breaker recesses 6, any number of tray recesses 10, and any type of circuit interrupter, such as the exemplary drawout circuit breaker 8, a stationary circuit breaker, or a circuit switching device. The enclosure 2 preferably provides one tray recess 10 for each circuit breaker 8. The drawout circuit breakers 8A,8B,8C,8D are insertable into and removable from the circuit breaker recesses 6A,6B,6C, 6D, respectively. In a related manner, which is described in detail below, the drawout termination trays 12A, 12B, 12C, 12D have a drawout mechanism 132 (see FIG. 6) which cooperates with the tray recesses 10A, 10B, 10C, 10D, respectively, for inserting a corresponding tray 12 therein and removing the corresponding tray 12 therefrom.

The exemplary enclosure 2 further includes four doors 14A,14B, 14C, 14D (shown in an open position) for each of the drawout circuit breakers 8A,8B,8C, 8D, respectively. The termination trays 12A, 12B, 12C, 12D have molded plastic front panels 18A,18B,18C,18D, respectively, which are fastened to the front surface 3 of the housing 4 by fasteners 20,22 at each end of the front panel 18. As discussed in detail below, the termination trays 12A, 12B, 12C, 12D hold external instrumentation and control wiring 23 (see FIGS. 2 and 8A) of the drawout circuit breakers 8A,8B, 8C, 8D, respectively.

Figure 2:
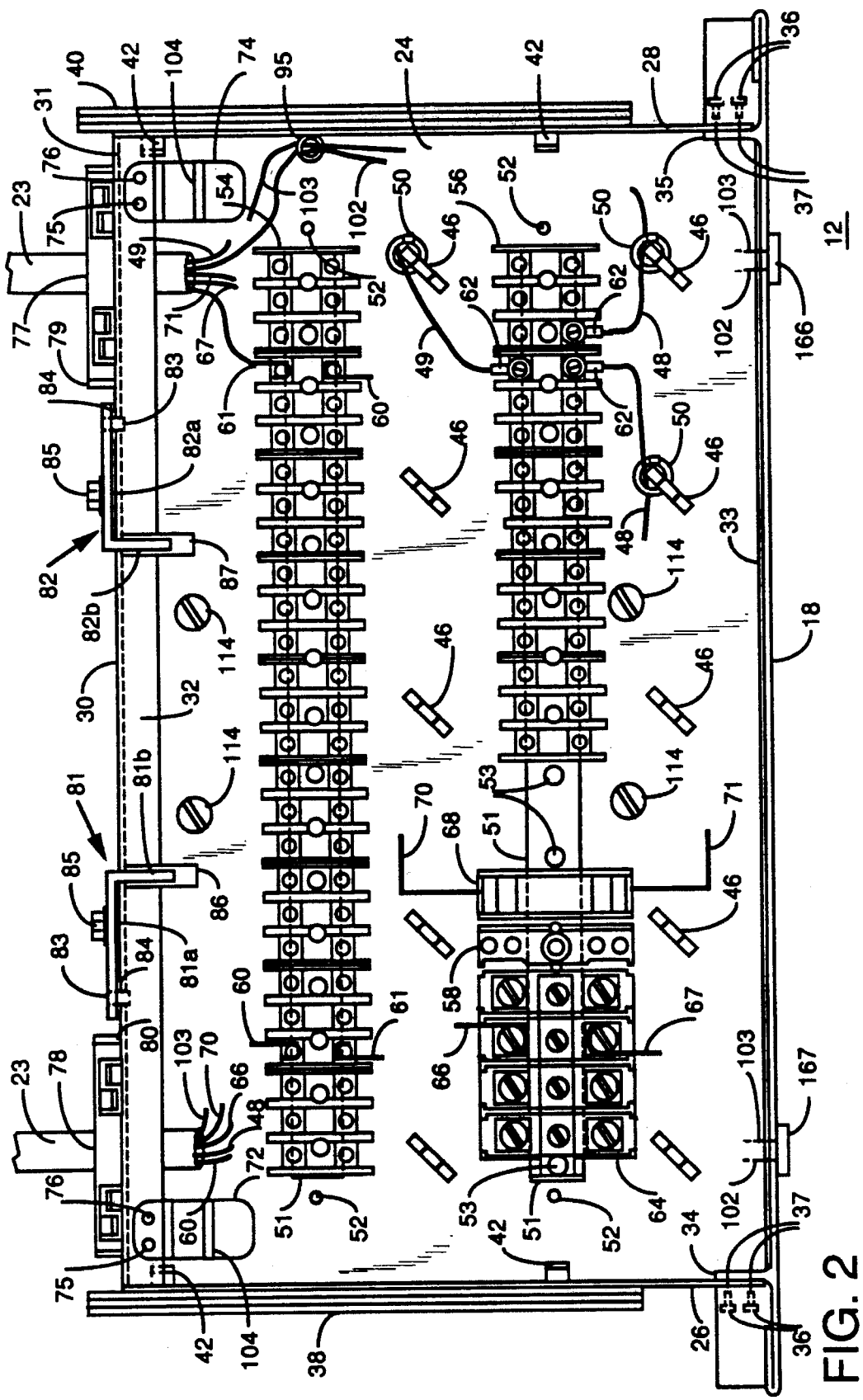
FIG. 2 is a top view of a drawout termination tray in accordance with the invention.

Referring now to FIG. 2, a top view of the termination tray 12 is illustrated. The tray 12 includes a bottom 24, two sides 26,28, a rear 30 having a bend 31 which forms a mounting surface 32, and a front 33. Two arms 34,35 of the front panel 18 are attached to the two sides 26,28 of the tray 12, respectively, by two screws 36 and two threaded holes 37 (see FIG. 7) within each of the arms 34,35. Two nylon slide bars 38,40 are respectively attached to the sides 26,28 of the tray 12 by two screws 42 and two hex nuts 44 (see FIG. 4).

The bottom 24 of the tray 12 has plural lances 46 for securing individual wires 48,49 of the wiring 23 to the tray 12 using a plurality of conventional tie-wraps 50. The bottom 24 further has a plurality of rails 51 mounted to mounting holes 52 by rivets 53. The rails 51 secure a variety of terminal blocks 54,56,58 which terminate the wiring 23. The exemplary box type terminal block 54 terminates a plurality of bare wires 60,61. The exemplary ring tongue terminal block 56 terminates a plurality of ring tongue terminals 62. The rails 51 also secure a variety of shorting blocks, such as the exemplary shorting block 64, which terminates a plurality of individual wires 66,67 of the wiring 23 from various current transformer circuits (not shown), and a variety of fuse blocks, such as the exemplary fuse block 68, which fuses a plurality of individual wires 70,71 of the wiring 23.

Figure 3:
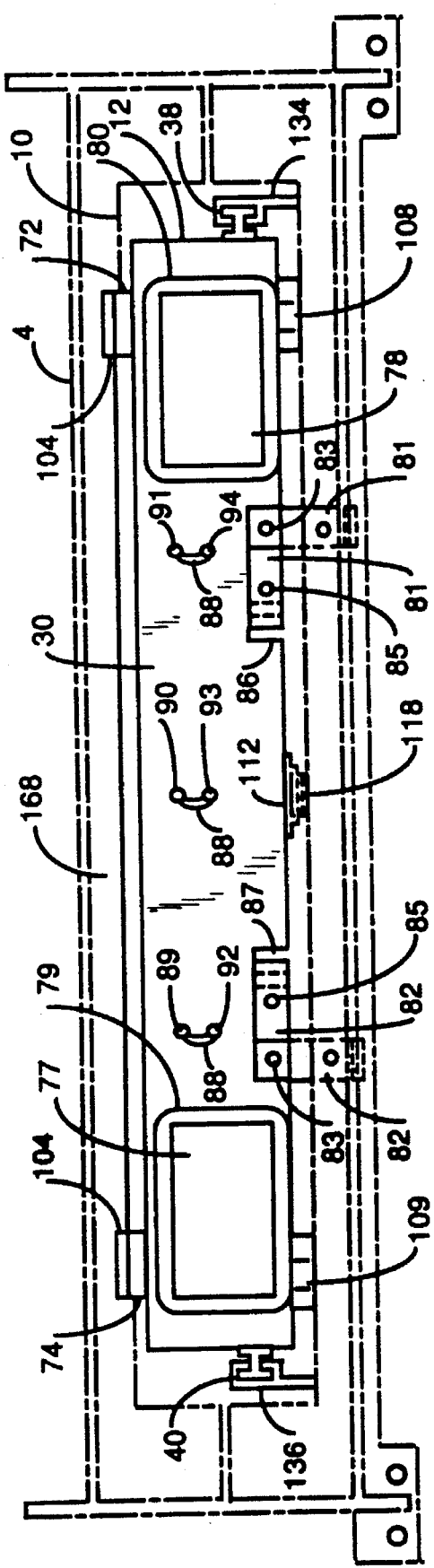
FIG. 3 is a rear view of a drawout termination tray which is slidably mounted in an enclosure in accordance with the invention.

Referring now to FIGS. 2–3, two nylon blocking tabs 72,74, which are discussed in detail below, are attached at either end of the surface 32 using two rivets 75,76. The rear 30 of the tray 12 includes two holes 77,78 for routing the wiring 23 therethrough. These holes 77,78 respectively hold peripheral protective plastic conduits 79,80 which cover the edge of each of the holes 77,78, in order to protect and isolate the wiring 23. Two L-shaped hanging brackets 81,82, which are described in detail below with FIGS. 5 and 8C, have pivot arms 81a,82a and securing arms 81b,82b, respectively. The pivot arms 81a,82a are first pivotally attached to the rear 30 of the tray 12 using rivets 83 and pivot washers 84. Next, the pivot arms 81a,82a are fixedly attached to the rear 30 by thread-forming screws 85. The securing arms 81b,82b of the brackets 81,82 respectively extend through two L-shaped slots 86,87 in the rear 30 and bottom 24 of the tray 12. A plurality of conventional tie-wraps 88 are inserted through a plurality of holes 89–94 and secure individual wires of the wiring 23 (see FIG. 2) thereto.

Figure 4:
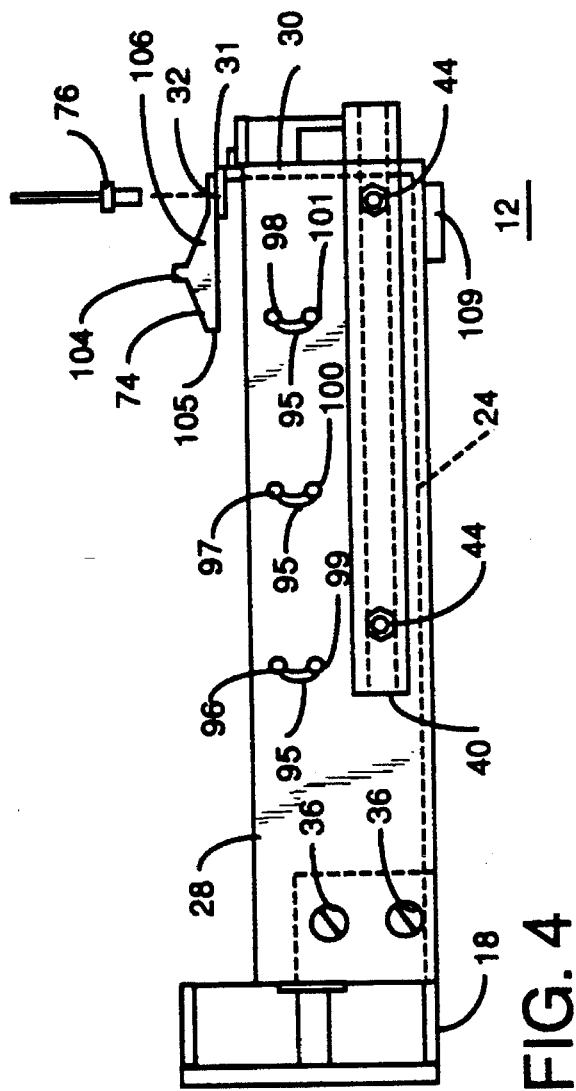
FIG. 4 is a side view of a drawout termination tray in accordance with the invention.

FIG. 4 is a side view of the tray 12. A plurality of conventional tie-wraps 95 are inserted through a plurality of holes 96–101 and secure a plurality of individual wires 102,103 (see FIG. 2) of the wiring 23 (see FIG. 2) to the side 28. The slide bar 40 is attached to the side 28 by two screws 42 (see FIG. 2) and two hex nuts 44. The triangular-shaped nylon tab 74 is attached to the mounting surface 32 using rivets 75 (see FIG. 2) and 76. The tabs 72 (see FIG. 2) and 74 include an upper blocking rib 104, a front edge 105 and a flexible mounting arm 106. As discussed in greater detail below, the front edge 105 and the flexible arm 106 allow the tabs 72,74 to be flexed downward, with respect to FIG. 4, in order to move the blocking rib 104 closer to the bottom 24 (shown in shadow) of the tray 12.

Figure 5:
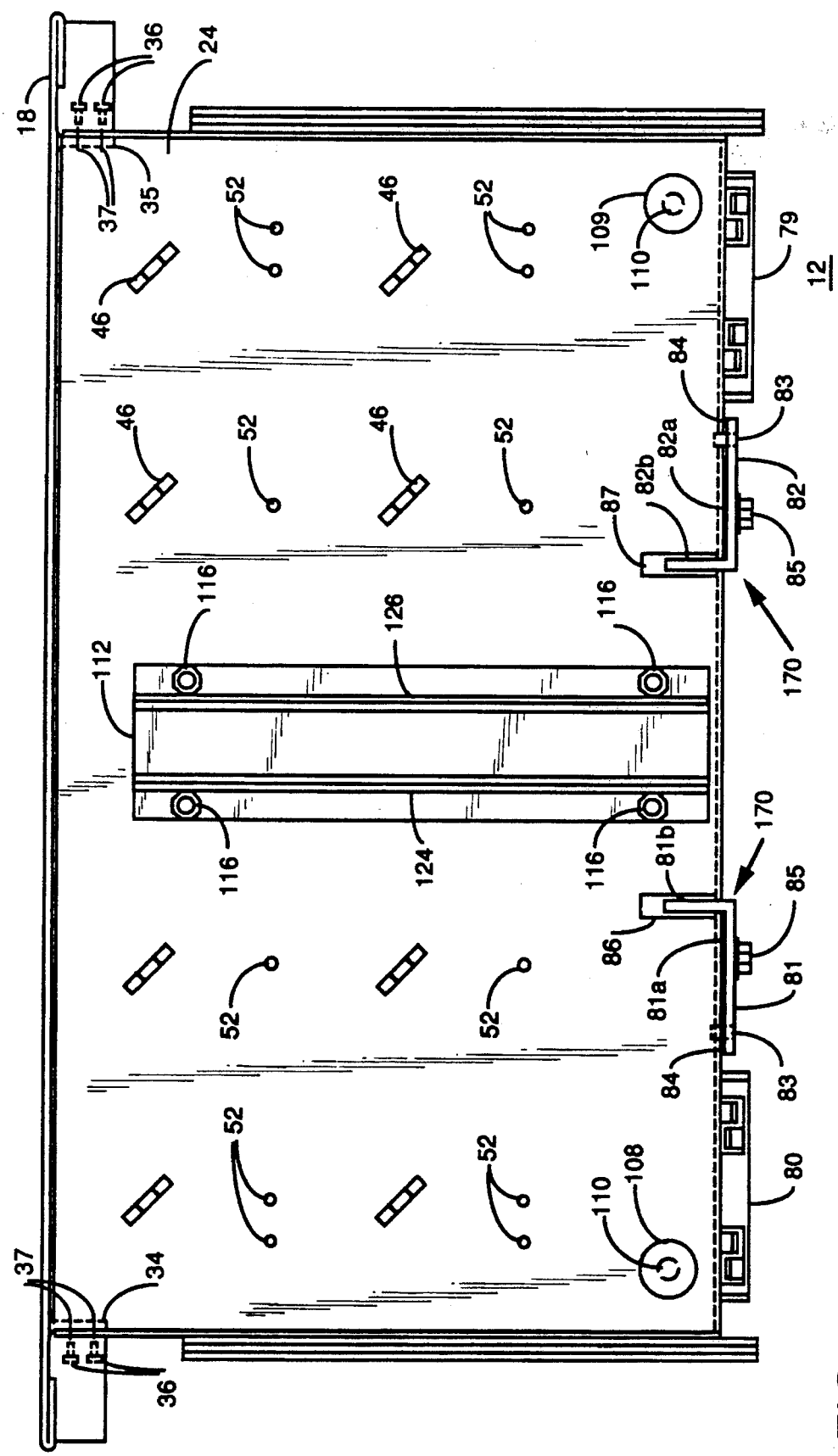
FIG. 5 is a bottom view of a drawout termination tray in accordance with the invention.

FIG. 5 illustrates a bottom view of the tray 12. As discussed above, the bottom 24 has plural lances 46 for securing individual wires 48,49 (see FIG. 2) thereto using tie-wraps 50 (see FIG. 2). The bottom 24 also has a plurality of holes 52 which secure rails 51 (see FIG. 2) for securing a variety of terminal blocks 54,56,58 (see FIG. 2), a variety of shorting blocks 64 (see FIG. 2) and a variety of fuse blocks 68 (see FIG. 2). Two rubber bumpers 108,109 are attached to the bottom 24 of the tray 12 by rivets 110. As further described in FIG. 8C below, whenever the screws 85 of each of the two L-shaped hanging brackets 81,82 are removed, each of the pivot arms 81a,82a may be pivoted about the rivets 83. In turn, the securing arms 81b,82b of the brackets 81,82 may be rotated upward, with respect to FIG. 5, and through the two L-shaped slots 86,87, respectively, in order to assume a hanging position (shown in shadow in FIG. 3) which is generally perpendicular with respect to the fixedly attached position of FIGS. 2, 3 and 5.

Figure 6:
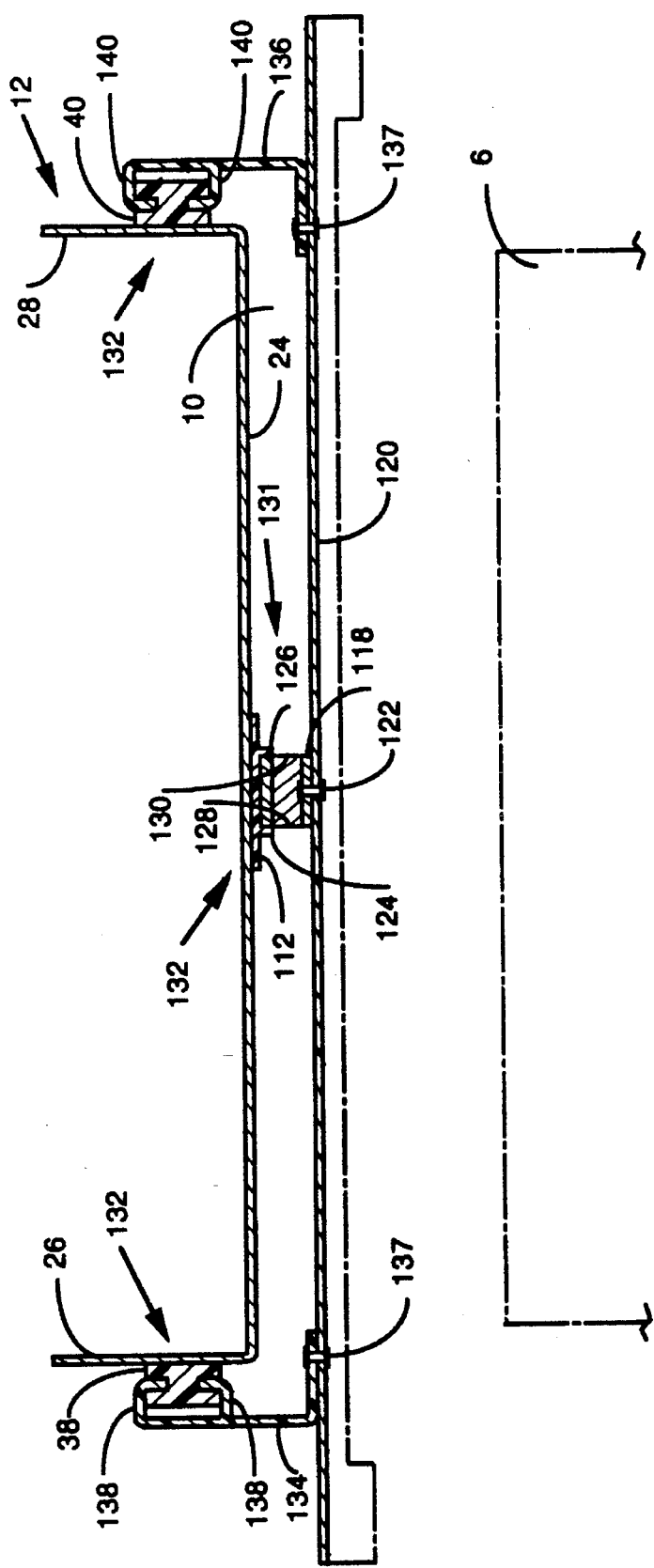
FIG. 6 is a vertical cross sectional view of a drawout termination tray which is slidably mounted in an enclosure in accordance with the invention.

Referring now to FIGS. 5–6, a rectangular nylon guide 112 is attached to the bottom 24 of the tray 12 using screws 114 (see FIG. 2) and hex nuts 116. A rectangular guide bar 118 is attached to an internal surface 120 of the enclosure 2 above the circuit breaker recess 6 and within the tray recess 10 by rivets 122. The guide 112, which rests on top of the guide bar 118, has two arms 124,126 which respectively abut the sides 128,130 of the guide bar 118.

FIG. 6 illustrates a vertical cross sectional view of the tray 12, which is slidably mounted in the tray recess 10 of the housing 4 (see FIG. 1) by a slider mechanism 131 formed by the guide 112 and the guide bar 118. A drawout mechanism 132 for the tray 12 includes the tabs 72,74 (see FIG. 2), the slide mechanism 131, the two nylon H-shaped slide bars 38,40 and two nylon L-shaped brackets 134,136. The brackets 134,136 are attached to the surface 120 by rivets 137 and extend within the tray recess 10. The slide bars 38,40 are respectively attached to the sides 26,28 of the tray 12. The L-shaped brackets 134,136 have two nylon C-shaped channels 138,140 for guiding the H-shaped slide bars 38,40, respectively. Accordingly, the tray 12 may be slidably inserted into or removed from the tray recess 10 of the housing 4 by the slide bars 38,40 within the channels 138,140, respectively, and the guide 112 above the guide bar 118.

Figure 7:
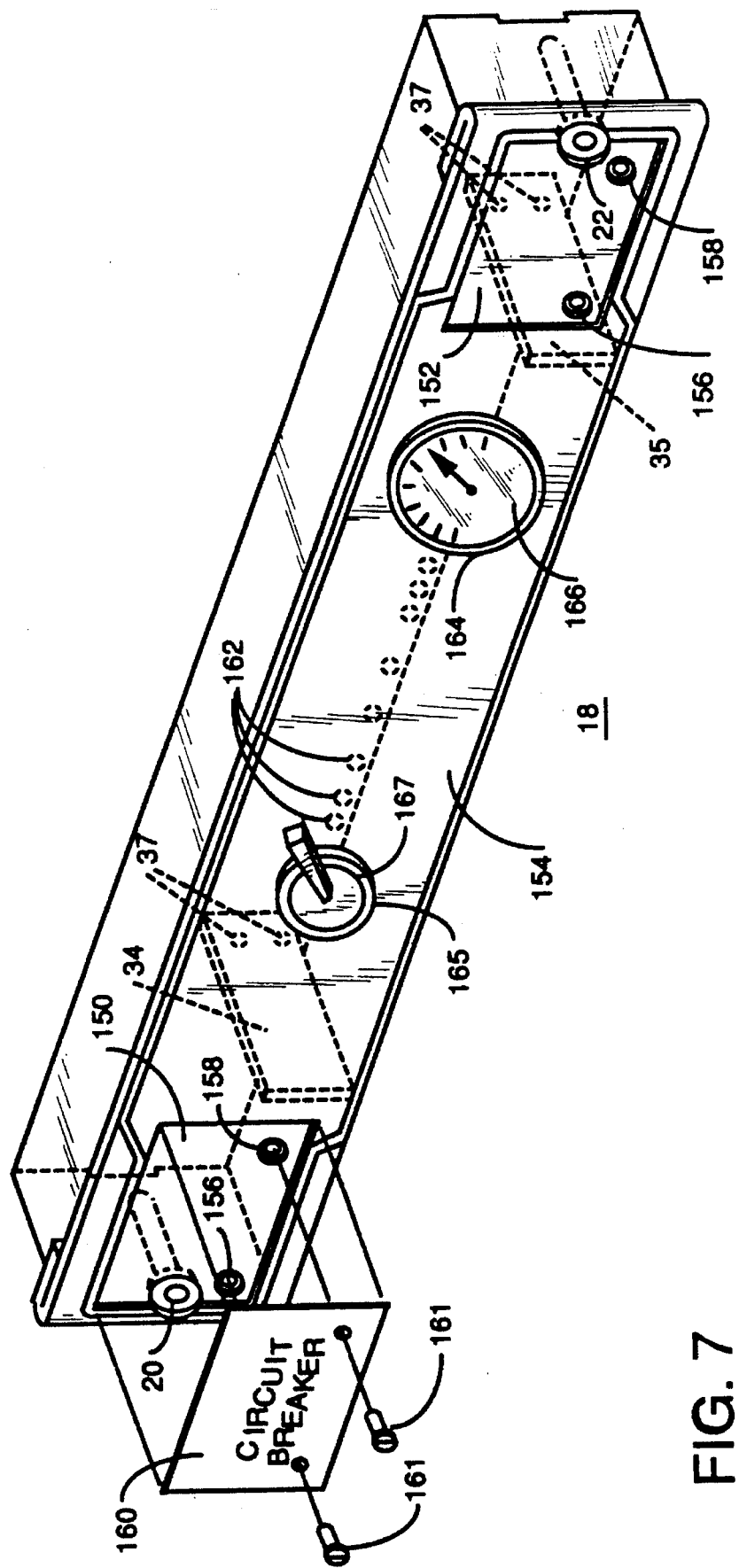
FIG. 7 is an isometric view of a front panel of a drawout termination tray in accordance with the invention.

Referring now to FIG. 7, an isometric view of the generally rectangular molded plastic front panel 18 is illustrated. The two arms 34,35 (shown in shadow) of the front panel 18 are attached to the two sides 26,28 (see FIG. 2) of the tray 12 (see FIG. 2), respectively. Two recessed fasteners 20,22 are retained at opposite ends of the front panel 18 to fasten the front panel 18 to the front surface 3 (see FIG. 1) of the housing 4 (see FIG. 1). Two recessed rectangular pockets 150,152 in the textured front 154 of the exemplary front panel 18 include two threaded holes 156,158 for securing a descriptive nameplate 160 thereto using two screws 161. The exemplary nameplate 160 includes descriptive information for the corresponding circuit breaker 8 (see FIG. 1). Alternatively, the exemplary nameplate 160 may be replaced or supplemented by a warning label or another descriptive placard in either or both of the pockets 150,152. The front panel 18 further includes plural internal center punches 162 (shown in shadow) for punching larger holes, such as the exemplary holes 164,165 therethrough, in order to mount instrumentation, such as the exemplary ammeter 166, control devices, such as the exemplary circuit interrupter control switch 167, or indicating lights (not shown), therein. Individual wires 102,103 (see FIG. 2) of the wiring 23 (see FIG. 2) are interconnected with the ammeter 166 and the switch 167. In this manner, as understood by those skilled in the art, the ammeter 166 measures a current flowing through the individual wires 102,103, and the switch 167 controls an operation of the circuit breaker 8.

Figure 8A:
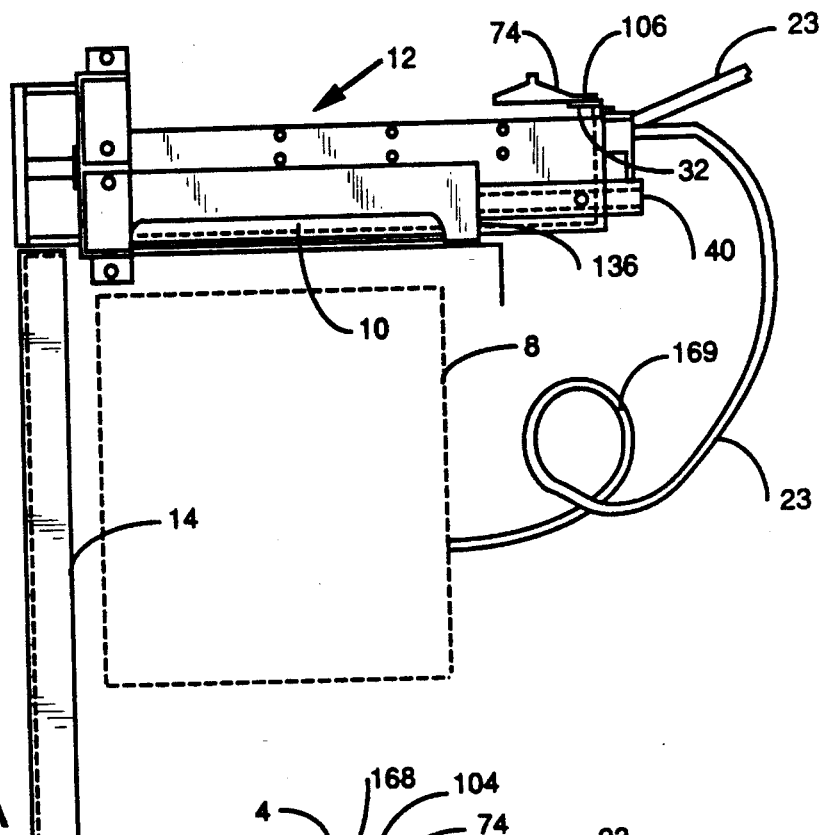
FIGS. 8A–8C are side views of a drawout termination tray in the connected position, in the partially drawnout position, and in the completely withdrawn and hanging position, respectively, in accordance with the invention.
Figure 8B:
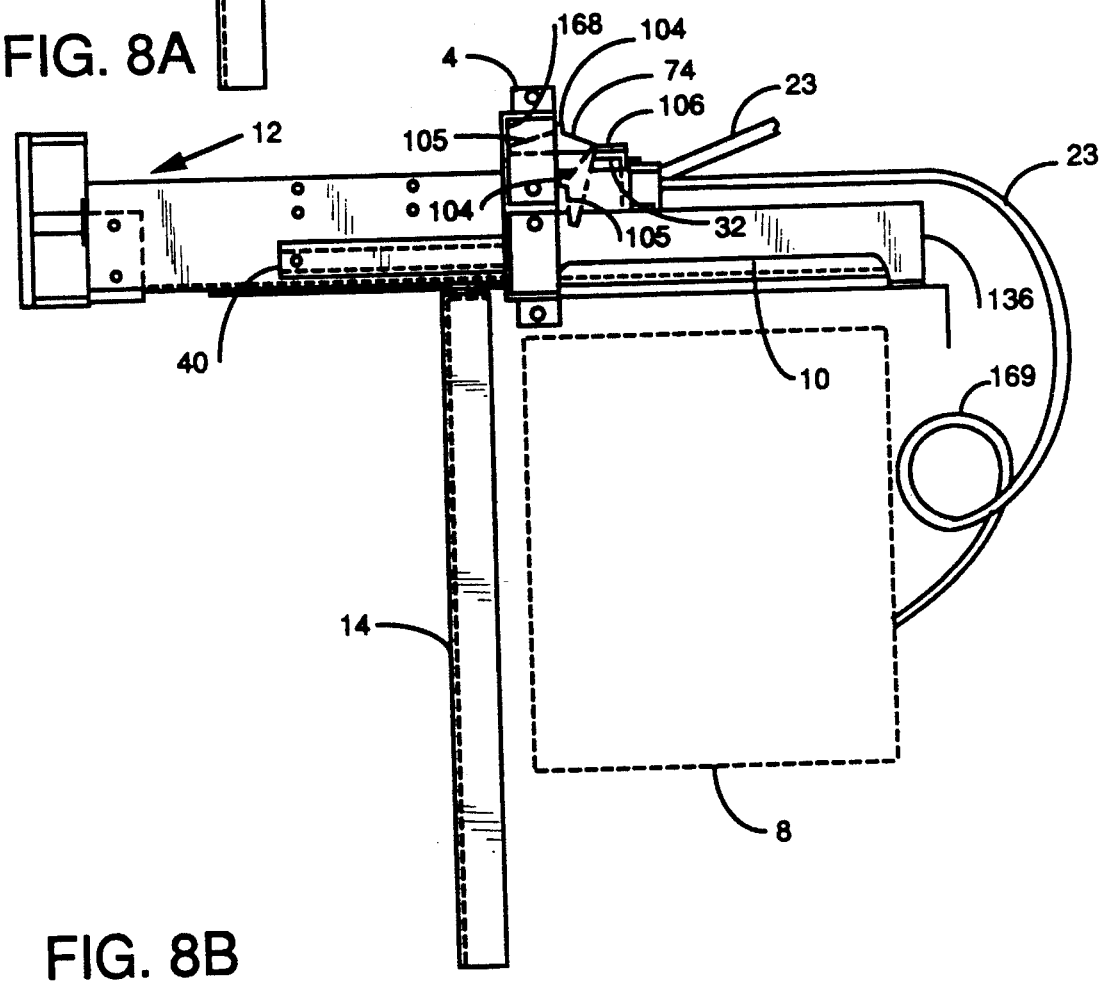
Figure 8C:
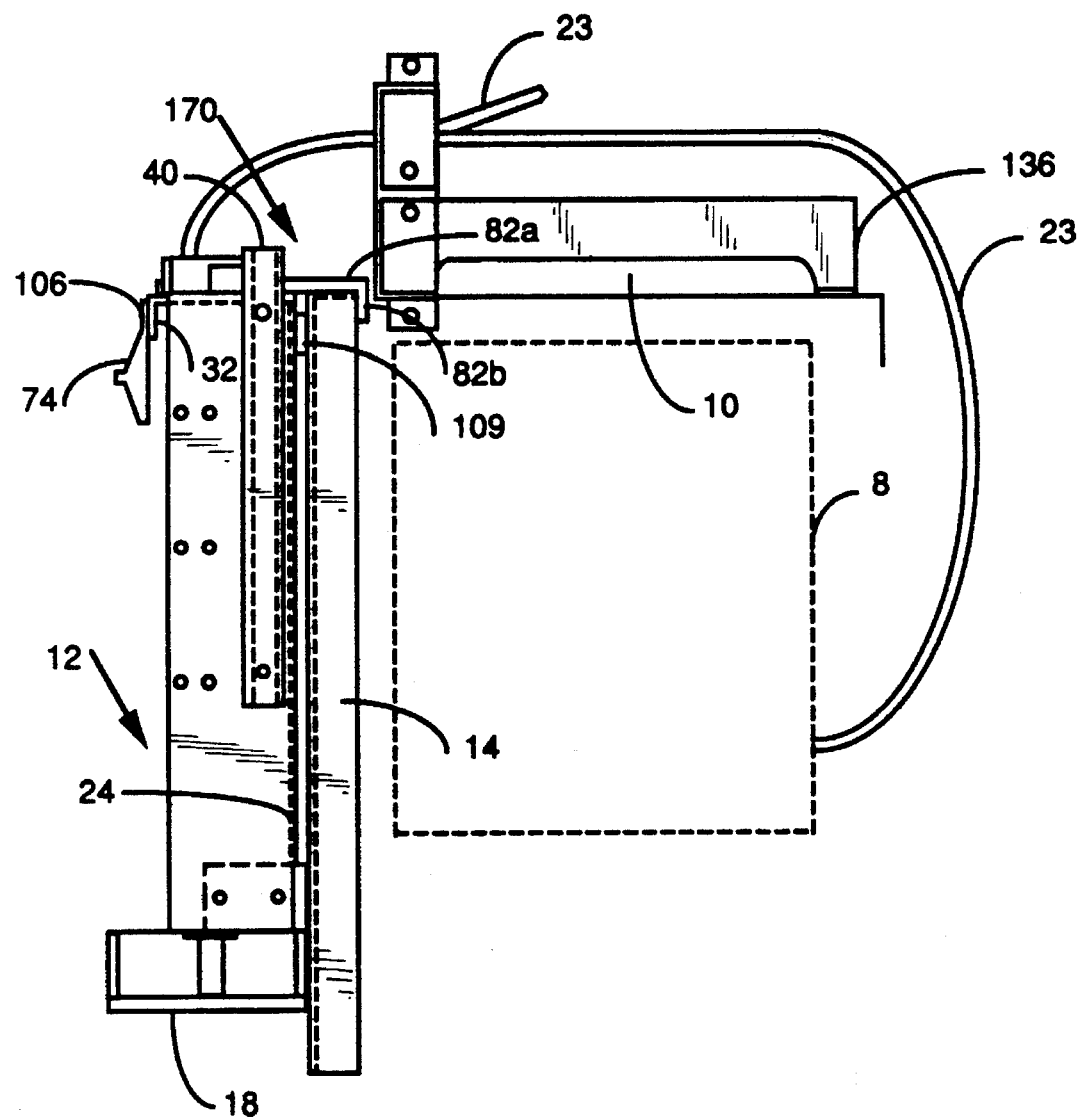

FIGS. 8A–8C are side views of the drawout tray 12 in the connected position, in the partially drawnout position, and in the completely withdrawn and hanging position, respectively. In FIG. 8A, the tray 12 is completely inserted in the tray recess 10 above the circuit breaker door 14 and the circuit breaker 8 (shown in shadow). Those skilled in the art will recognize that a sufficiently long loop 169 of the wiring 23 must be provided in the connected position, in order to permit the tray to be both partially drawnout and completely withdrawn from the tray recess 10.

FIG. 8B illustrates the tray 12 in the partially drawnout position. The H-shaped slide bar 40 has been partially drawnout from the bracket 136, in order to partially drawout the tray 12 from the tray recess 10 and the enclosure 2 (see FIG. 1). The blocking tab 74 is attached to the mounting surface 32 by the flexible arm 106. The upper blocking rib 104 of the tab 74 abuts a surface 168 (see, also, FIG. 3) of the housing 4, in order to prevent complete removal of the tray 12 from the tray recess 10. Whenever the flexible arm 106 of the tab 74 is flexed downward by the front edge 105, as shown in shadow in FIG. 8B, the blocking rib 104 moves closer to the bottom 24 (see FIG. 2) of the tray 12. Accordingly, whenever both of the front edges 105 of the tabs 72 (see FIG. 2) and 74 are moved downward (as shown in shadow), and the corresponding blocking ribs 104 are beneath an edge of the surface 168 of the housing 4 above the tray recess 10, the tray 12 may be completely withdrawn from the tray recess 10 and the enclosure 2.

Referring now to FIGS. 5 and 8C, a hanging mechanism 170 includes the two L-shaped hanging brackets 81,82. In the completely withdrawn position of FIG. 8C, the tray 12 may be hung from the top of the exemplary door 14 (shown in a closed position) by the brackets 81 (see FIG. 5) and 82. As described above with FIG. 5, whenever the screws 85 for each of the two L-shaped brackets 81,82 are removed, each of the pivot arms 81a,82a may be pivoted about the rivets 83 to the hanging position (shown in shadow in FIG. 3). As illustrated in FIG. 8C, the pivot arm 82a extends away from the bottom 24 (see FIG. 2) of the tray 12 and assumes a position that is generally perpendicular to the fixedly attached position of FIG. 5. As further illustrated in FIG. 8C, the pivot arm 82a rests on top of the circuit breaker door 14 and the securing arm 82b is to the right of the door 14, in order to maintain the hanging position of the tray 12 with respect to the door 14. In this hanging position, the two rubber bumpers 108 (see FIG. 5) and 109, and the front panel 18, separate the bottom 24 of the tray 12 from the door 14.

Referring now to FIGS. 2 and 8C, whenever an instrumentation and control service electrician initially installs the wiring 23 for a particular circuit breaker 8, the corresponding tray 12 is removed from the enclosure 2 (see FIG. 1) and is hung on the corresponding door 14 as shown in FIG. 8C. The wiring 23 is routed through the conduits 79,80 at the rear holes 77,78 (see FIG. 3). The individual wires 48,49, 60,61,66,67,70,71,102,103 are first terminated at the corresponding terminal blocks 54,56,58, shorting blocks 64 and fuse blocks 68, and then are secured using tie-wraps 50,95 and 88 (see FIG. 3). This provides an orderly organization of the wiring 23 for future maintenance, repair or retrofit.

Referring again to FIGS. 6, 8B, 8A and 1, after the initial installation of the wiring 23, the tray 12 is reinserted in the corresponding tray recess 10 by first inserting the slide bars 38,40 in the C-shaped channels 138,140, respectively. Then, the guide 112 is aligned above the guide bar 118. Next, the front edges 105 of the tabs 72 (see FIG. 2) and 74 are moved downward, in order that the tray 12 may be inserted within the corresponding recess 10 as illustrated in FIG. 8B and FIG. 8A. Finally, the front panel 18 is secured to the front surface 3 of the housing 4 using the two recessed fasteners 20,22.

In the event the circuit breaker 8 is removed for maintenance or repair, or in the event that any changes or additions to the wiring 23 are required, the tray 12 may be easily removed, as described above with FIG. 8C, and hung on the door 14, in order to facilitate the requisite wiring modifications. In this manner, the instrumentation and control service electrician may conveniently perform such modifications away from the higher switchgear voltages which are typically present at the rear of the circuit breaker 8.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. An enclosure for at least one drawout circuit interrupter having external wiring, said enclosure comprising:

a housing having a first plurality of recesses, each of the first plurality of recesses for housing a corresponding one of said at least one drawout circuit interrupter which is insertable into and removable from the corresponding one of the first plurality of generally horizontal recesses, said housing also having a second plurality of recesses said housing having a generally vertical frontal surface;

at least one tray means, each of which hold said wiring for a corresponding one of said at least one drawout circuit interrupter, and which is horizontally slidably mounted in said housing in a corresponding one of the second plurality of generally horizontally recesses;

at least one drawout means, each of which cooperate with a corresponding one of the second plurality of generally horizontally recesses for horizontally inserting a corresponding one of said at least one tray means therein and removing the corresponding one of said at least one tray means therefrom; and at least one hanging means, each of which cooperate with the corresponding one of said at least one tray means for vertically hanging the corresponding one of said at least one tray means from said enclosure in a plane generally corresponding to said generally vertical frontal plane.

2. The enclosure as recited in claim 1 wherein each of said at least one tray means has a front, a front panel means for attachment to the front, and a fastening means for fastening the front panel means to said housing.

3. The enclosure as recited in claim 2 wherein each of the front panel means is a molded panel.

4. The enclosure as recited in claim 3 wherein the molded panel includes recess pocket means for holding a descriptive means for describing the corresponding one of said at least one drawout circuit interrupter.

5. The enclosure as recited in claim 3 wherein the molded panel includes two arms and attachment means for attaching the molded panel to the corresponding one of said at least one tray means.

6. The enclosure as recited in claim 3 wherein the molded panel further includes instrumentation means for monitoring a condition of said wiring.

7. The enclosure as recited in claim 6 wherein the molded panel further includes an internal center punch for punching a hole which is larger than the internal center punch, in order to mount control means in the hole for controlling an operation of the corresponding one of said at least one drawout circuit interrupter.

8. The enclosure as recited in claim 1 wherein each of said at least one tray means has plural securing means for securing said wiring thereto.

9. The enclosure as recited in claim 1 wherein each of said at least one tray means has a rear side which has at least one hole for routing said wiring therethrough.

10. The enclosure as recited in claim 9 wherein the at least one hole has protection means for protecting said wiring from an edge of the rear side.

11. The enclosure as recited in claim 1 wherein each of said at least one tray means has a bottom side which has securing means for securing termination means for terminating said wiring.

12. The enclosure as recited in claim 1 wherein each of said at least one drawout means has a corresponding sliding means for slidably removing the corresponding one of said at least one tray means from said housing.

13. The enclosure as recited in claim 12 wherein each of the sliding means includes a guide bar beneath the corresponding one of said at least one tray means, and wherein each of said at least one tray means includes a bottom having a guide means which rests on the corresponding guide bar and which has two arms each of which abut a side of the corresponding guide bar.

14. The enclosure as recited in claim 12 wherein each of said at least one drawout means further has two H-shaped slide bar means and two L-shaped brackets attached within the corresponding one of the second plurality of recesses, each of the two H-shaped slide bar means are attached to a side of the corresponding one of said at least one tray means, each of the two L-shaped brackets have a C-shaped channel for guiding one of the two H-shaped slide bar means therein.

15. The enclosure as recited in claim 1, wherein each of said at least one drawout circuit interrupter has a door, and wherein each of said at least one hanging means includes two L-shaped brackets attached to the corresponding one of said at least one tray means, the L-shaped brackets having a first position when the corresponding one of said at least one tray means is slidably mounted in said housing in the corresponding one of the second plurality of recesses, and the L-shaped brackets having a second position when the corresponding one of said at least one tray means is withdrawn from said enclosure for hanging the corresponding one of said at least one tray means on the door of the corresponding one of said at least one circuit interrupter.

16. A drawout apparatus for slidably mounting in an enclosure with a circuit interrupter having external wiring, said apparatus comprising:

tray means for holding said wiring, said tray means having a bottom and a front;

termination means for terminating said wiring thereto, said termination means secured to the bottom of said tray means;

front panel means attached to the front of said tray means for fastening said tray means to said enclosure;

drawout means cooperating with said tray means and said enclosure for horizontally removing said tray means from said enclosure in a horizontal plane; and hanging means attached to said tray means for vertically hanging said tray means from said enclosure in a plane generally ninety degrees offset vertically from said horizontal plane.

17. The apparatus as recited in claim 16, wherein said termination means includes a terminal block.

18. The apparatus as recited in claim 17, wherein said termination means further includes a fuse block.

19. An enclosure for at least one drawout circuit interrupter having external wiring, said enclosure comprising:

a housing having a first plurality of recesses, each of the first plurality of recesses for housing a corresponding one of said at least one drawout circuit interrupter which is insertable into and removable from the corresponding one of the first plurality of recesses, said housing also having a second plurality of recesses;

at least one tray means, each of which hold said wiring for a corresponding one of said at least one drawout circuit interrupter, and which is slidably mounted in said housing in a corresponding one of the second plurality of recesses;

at least one drawout means, each of which cooperate with a corresponding one of the second plurality of recesses for inserting a corresponding one of said at least one tray means therein and removing the corresponding one of said at least one tray means therein and removing the corresponding one of said at least one tray means therefrom;

at least one hanging means, each of which cooperate with the corresponding one of said at least one tray means for hanging the corresponding one of said at least one tray means from said enclosure; and each of said at least one drawout means has a corresponding sliding means for slidably removing the corresponding one of said at least one tray means from said housing; each of said at least one drawout means further has two It-shaped slide bar means and two H-shaped brackets attached within the corresponding one of the second plurality of recesses, each of the two H-shaped slide bar means being attached to a side of the corresponding one of said at least one tray means each of the two L-shaped brackets have a C-shaped channel for guiding one of the two H-shaped slide bar means therein.

20. The enclosure as recited in claim 19 wherein each of said at least one drawout means further has at least one blocking means for at least partially blocking a drawout movement of the corresponding one of said at least one tray means from the corresponding one of the second plurality of recesses.

21. The enclosure as recited in claim 20, wherein the corresponding one of said at least one tray means has a mounting surface, wherein the at least one blocking means is two blocking tabs, each of which have an arm which is attached to the mounting surface, a blocking surface for contacting the front surface of said housing whenever the corresponding one of said at least one tray means is at least partially drawnout from said enclosure, and flexible means for moving the blocking surface away from said generally vertical frontal surface, in order to permit complete withdrawal of the corresponding one of said at least one tray means from the corresponding one of the second plurality of recesses and said enclosure.

22. An enclosure for at least one drawout circuit interrupter having external wiring, said enclosure comprising:

a housing having a first plurality of recesses, each of the first plurality of recesses for housing a corresponding one of said at least one drawout circuit interrupter which is insertable into and removable from the corresponding one of the first plurality of recesses, said housing also having a second plurality of recesses;

at least one tray means each of which hold said wiring for a corresponding one of said at least one drawout circuit interrupter and which is slidably mounted in said housing in a corresponding one of the second plurality of recesses;

at least one drawout means each of which cooperate with a corresponding one of the second plurality of recesses for inserting a corresponding one of said at least one tray means therein and removing the corresponding one of said at least one tray means therefrom; and at least one hanging means, each of which cooperate with the corresponding one of said at least one tray means for hanging the corresponding one of said at least one tray means from said enclosure; and each of said at least one drawout circuit interrupter has a door, and wherein each of said at least one hanging means includes two L-shaped brackets attached to the corresponding one of said at least one tray means, the L-shaped brackets having a first position when the corresponding one of said at least one tray means is slidably mounted in said housing in the corresponding one of the second plurality of recesses, and the L-shaped brackets having a second position when the corresponding one of said at least one tray means is withdrawn from said enclosure for hanging the corresponding one of said at least one tray means on the door of the corresponding one of said at least one circuit interrupter.

* * * * *